United States Patent [19]

Miyawaki et al.

[11] Patent Number: 5,530,519
[45] Date of Patent: Jun. 25, 1996

[54] METHOD AND APPARATUS FOR PROCESSING CONTROL STRIP

[75] Inventors: Hiroshi Miyawaki; Hiroto Nakao, both of Wakayama, Japan

[73] Assignee: Noritsu Koki Co., Ltd., Wakayama, Japan

[21] Appl. No.: 199,270

[22] PCT Filed: May 12, 1992

[86] PCT No.: PCT/JP93/00625

§ 371 Date: Feb. 28, 1994

§ 102(e) Date: Feb. 28, 1994

[87] PCT Pub. No.: WO94/00799

PCT Pub. Date: Jan. 6, 1994

[30] Foreign Application Priority Data

Jun. 30, 1992 [JP] Japan .................................. 4-195973
Jul. 15, 1992 [JP] Japan .................................. 4-210889

[51] Int. Cl.⁶ .................................................. G03B 27/58
[52] U.S. Cl. .............................. 355/75; 355/40; 355/72; 355/76
[58] Field of Search .................................. 355/40, 72, 74, 355/75, 76

[56] References Cited

U.S. PATENT DOCUMENTS

| | | | |
|---|---|---|---|
| 4,984,016 | 1/1991 | Makino et al. | 355/72 |
| 5,130,745 | 7/1992 | Cloutier et al. | 355/40 |
| 5,162,842 | 11/1992 | Shiota | 355/40 |
| 5,328,032 | 7/1994 | Gedalovitz | 355/75 |

FOREIGN PATENT DOCUMENTS

| | | |
|---|---|---|
| 53-53977 | 5/1978 | Japan . |
| 61-292642 | 12/1986 | Japan . |
| 62-27344 | 2/1987 | Japan . |
| 62-184447 | 8/1987 | Japan . |
| 1-216356 | 8/1989 | Japan . |
| 2-189539 | 7/1990 | Japan . |

Primary Examiner—Michael L. Gellner
Assistant Examiner—D. P. Malley
Attorney, Agent, or Firm—Lowe, Price, LeBlanc & Becker

[57] ABSTRACT

A control strip holder having a light interrupting door opened and closed by the instruction of an external open-and-close instruction means is installed on the exposure table of an automatic printing and developing machine, which is provided with the open-and-close instruction means. The control strip is automatically drawn out from the holder, held onto the exposure table by air-suction and transferred to the developing unit. The control strip is drawn out by the holding force of the exposure table. As a structure for concentrating the holding force on the driving of the control strip, a mask plate is provided on the control strip holder to cover almost all the holding zone of the exposure table. The leading end of the control strip remaining outside the control strip holder is held on the exposure table by a force which is stronger than exerted on normal paper. Thus, the control strip is transferred to the developing unit through the outlet by the paper conveying belt of the exposure table.

2 Claims, 11 Drawing Sheets

METHOD AND APPARATUS FOR PROCESSING CONTROL STRIP

TECHNICAL FIELD

The present invention relates to methods and apparatuses utilizing control strips for managing the developer or the like in relation to automated print and development apparatuses, where photosensitive substances are used for printing negative images.

BACKGROUND ART

Management of the developer in automated print and development apparatuses is conventionally conducted based on the processing of what is called a control strip, which is a photographic printing paper.

The control strip is a photographic printing paper where an emulsion is spread, and is located in the dark inside of a dark chamber called a control strip holder, which is provided with a shielding port exclusively for using with automated print and development apparatus. To the control strip's leading end that protrudes from the control strip holder and that is exposed is attached a special control-strip-leader with splice tape, and the leader is then installed in the automated print and development apparatus for the processing.

FIG. 1 illustrates in perspective view a conventional control strip holder. The control strip 1 is inserted in the control strip holder 2. FIG. 2 shows the sectional view of a conventional control strip holder and shows the manner in which the control strip loaded in the control strip holder of FIG. 1 is being drawn out.

The control strip 1 is attached to the leader 3 with splice tapes 4 and 5. By pulling at the leader 3, the control strip is cleared of the shielded port of the control strip holder.

While the shielded port of a conventional control strip holder is formed of oppositely placed velvets as shown in FIGS. 1 and 2, and the control strip is inserted through the gap in the velvets, in practice putting the control strip through the gap had been a difficult task.

In addition, owing to the fact that the force required for pulling the control strip once the said control strip is loaded in the control strip holder is also as large as roughly 1 kg, the control strip had been drawn from the automated print and development apparatus with a force supplying means by pulling a leader, which was fixed to the control strip with tapes.

Nevertheless, this process of fixing a control strip leader had not been an easy, and it is thus desired to perform the control strip processing in a much simplified manner. The present invention therefore has the objective of simplifying the control strip processing by the utilization of a new construction for the control strip holder.

DISCLOSURE OF THE INVENTION

In order to solve the above problem, a control strip holder whereof the shielding door can be opened or closed by means of externally executed commands to open or close is positioned on the exposure station of an automated print and development apparatus that is provided with the means of executing commands for opening and closing the shielding door of the control strip holder, and having automatically drawn from the control strip holder, the control strip is adhered on the exposure station and conveyed to the development processing section. Drawing of the control strip is to be accomplished by utilizing the suction force of exposure station. In that manner, the structure of the control strip is devised so as the suction strength of the exposure station is amply available for the drawing of the control strip, and thus the drawing of the control strip is made possible by the suction force of the exposure station.

The operation of the present inventive apparatus is described as follows. Having arranged a control strip holder that has a shielded opening and a control strip, the shielded door of the control strip holder is opened inside of a dark chamber (or a darkroom), and the shielded door is then closed having inserted one sheet of control strip in the control strip holder.

The control strip holder taken out from the dark chamber (or the darkroom) is then positioned, after opening the shielded door of the automated print and development apparatus, on the exposure station, and the shielded door of the automated print and development apparatus is closed after the positioning. The control strip holder moves together with the exposure station, and a pin positioned in frame releases the locking lever of the shielding door of the control strip holder opening the shielding door of the control strip holder.

Suction fan of the exposure station for adherence of photographic paper is activated, and the control strip is adhered to the exposure station. The exposure station returns along with the control strip holder to the original position (on the photographic paper conveyor path). The conveyor belt of photographic paper of the exposure station is activated, and the control strip is conveyed via the exit to the development processing section.

The principal operations of the control strip processing apparatus of the present invention is as follows. A chamber provided with a shielded opening forms the control strip holder, and one sheet of control strip is inserted through the shielded opening of the control strip holder in the environment of a lightproof chamber. However, roughly 50 mm from the leading edge of the control strip holder is left outside of the control strip holder.

The control strip holder taken out of the lightproof chamber is positioned on the exposure station after opening the shielding door of the automated print and development apparatus, and the shielding door is then closed. Owing to the fact that the control strip holder covers the most parts of the suction region of the exposure station, the suction force that originates when the suction fan of the exposure station is activated acts on that part of the control strip which is outside of the control strip holder.

The leading portion of roughly 50 mm of the control strip is adhered to the exposure station with much stronger force than in the case of conventional photographic papers. The conveyor belt of the exposure station is activated, and the control strip is conveyed through the exit section to the development processing section. For control strip processing of the present invention to be executed, there must exist operational means dealing with both sides, the control strip holder and automated print and development apparatus.

The control strip processing apparatuses of the present invention, as described above, has made it feasible, by using a simple construction, to utilize the suction force of the exposure station for the purpose of drawing the control strip. The automated print and development apparatus itself, thus, does not require any operational means dealing with the pulling of the control strip. Eliminated thus are the leader required for the operation of pulling and the difficulties in fixing the control strip to the leader with splice tape or the like. The operation of fitting the leading end of the leader or the control strip to a device becomes redundant, and the control-strip processing also becomes simpler with the effect that the developer can be quickly managed.

BEST MODE FOR CARRYING OUT THE INVENTION

Figure 1:
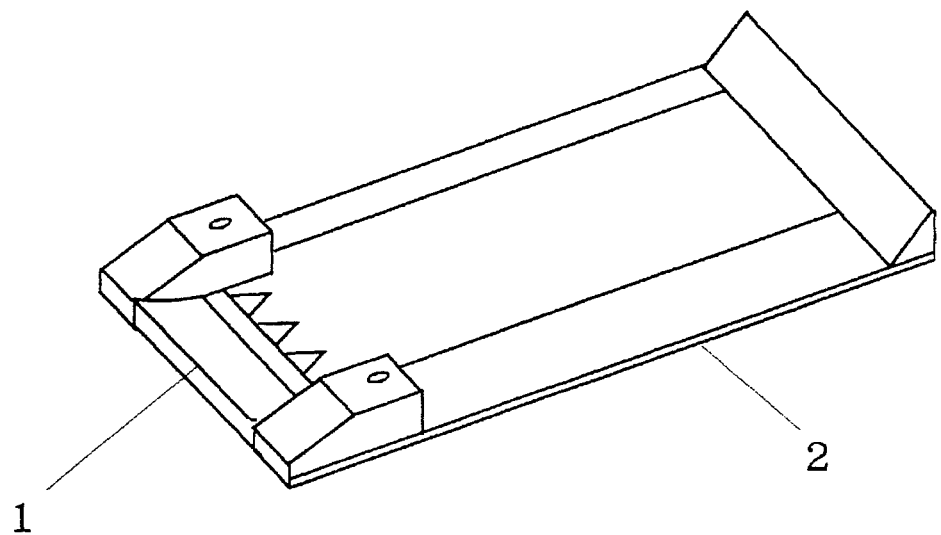
FIG. 1 shows in perspective view a conventional control strip, and FIG. 2 the sectional view of a conventional control strip holder.
Figure 2:
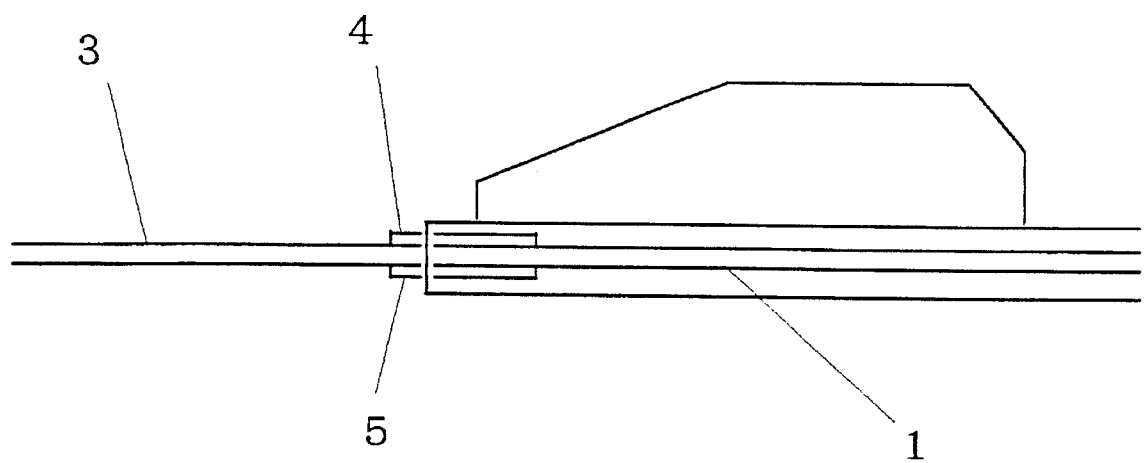
Figure 3:
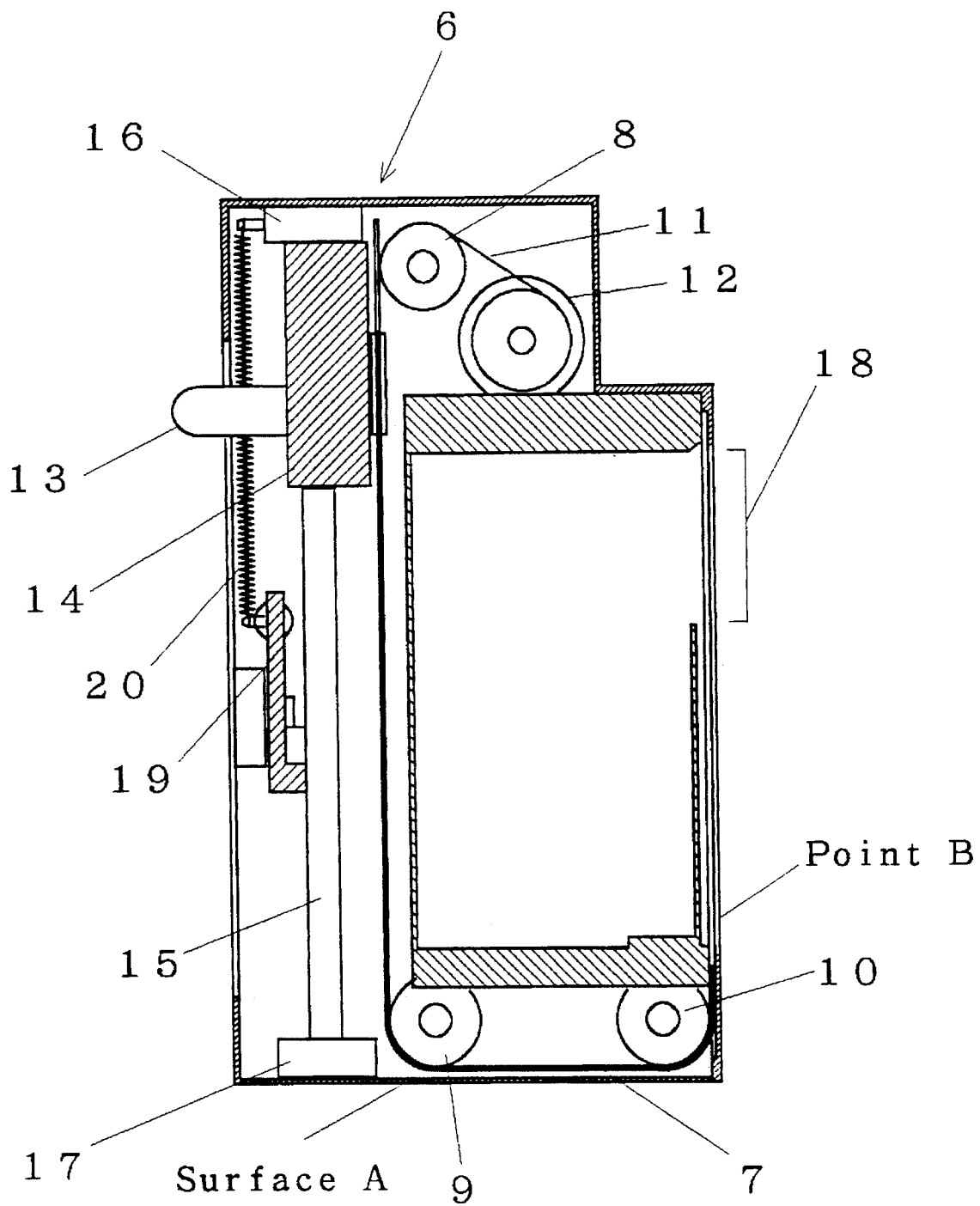
FIG. 3 illustrates the embodiment of the control strip holder of present invention.

The embodiment of the present invention is described in detail using diagrams. FIG. 3 illustrates a diagram of the holder of the control strip according to an embodiment of the present invention and shows the open state of shutter curtain of the control strip holder. The control strip holder 6, which is a dark-chamber fitted with a shutter is placed with the face A facing downward. The shutter entrance in the control strip holder can be opened or closed by moving the shutter curtain 7 that is guided by the guide-rollers 8, 9 and 10, and said shutter curtain 7 is put to an energized state by winding a spring 11 of uniform output on the spring-holder 12 in such a manner as the shutter curtain tends to open.

A locking block 14 fitted with a locking lever 13 is secured to the trailing end of the shutter curtain and can be moved up or down along the guide shaft 15. The movement of the locking block 14 is constrained by the stoppers 16 and 17 each of which is secured respectively at the top and bottom ends of the guide shaft 15.

When the locking block 14 is in contact with the stopper 16 at the top-end, the shutter curtain 7 is in the state of being pressed-down and the port 18 for control strip insertion is also open.

Figure 4:
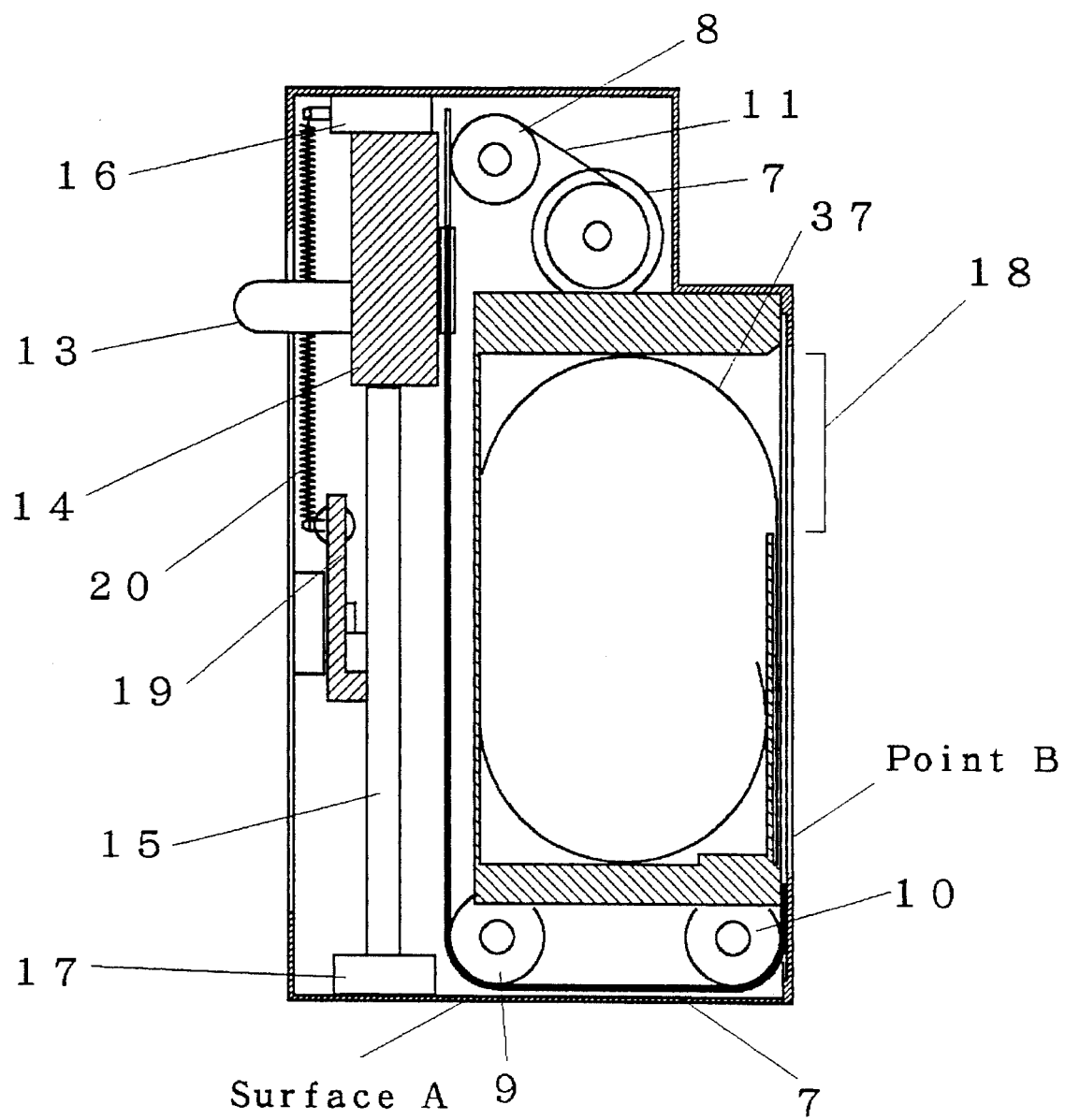
FIG. 4 illustrates the manner in which a control strip is installed in the control strip holder according to an embodiment of the present invention.

FIG. 4 is a diagram illustrating the manner in which the control strip is placed in the control strip holder according one embodiment of the present invention. The control strip 37 is wound lengthwise, as shown in the figure, inside of a lightproof bag or a dark-room keeping the emulsion surface of the strip inwards.

The control strip 37 is inserted through the port 18 in the control-strip holder 6 that is in a state where the shielding door is open, and the leading edge of the outward surface of the coiled control strip 37 is held at point B by hand. This state is the state of the leading edge of the control strip of FIG. 4.

Figure 5:
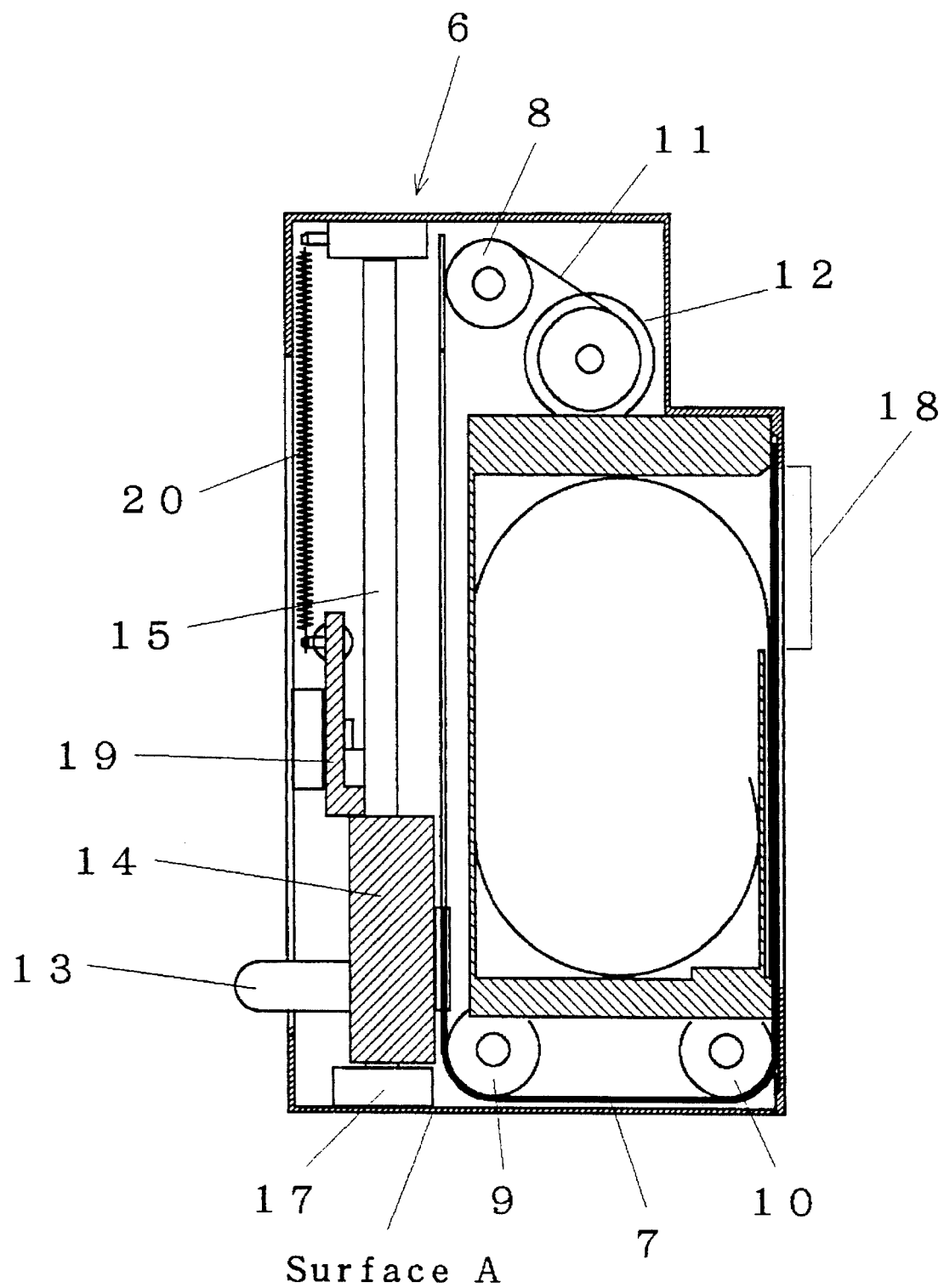
FIG. 5 shows the state in which the shutter curtain is closed following the placement of the control strip within control-strip holder according to an embodiment of the present invention.

FIG. 5 shows a diagram depicting the state in which the shutter is closed following the placement of the control strip within the control-strip holder of the present invention. When the shutter is closed by pressing the locking lever 13 down toward the surface A, the state shown in FIG. 5 is realized. In that state in which the locking-block 14 is in contact with the bottom-end stopper, the insertion port 18 of control strip is closed by the shutter curtain.

Because of the fact that the locking lever 13 is coupled with the shutter curtain and the uniform-output spring 11 via the locking block 14, when the locking lever 13 is being pressed down, the shielding door gets closed while, at the same time, the uniform-output spring 11 gets stretched, and before the locking block comes into contact with the stopper 17, a locking arm 19 is activated making the shielding door to remain be closed by the shutter 7.

Figure 6:
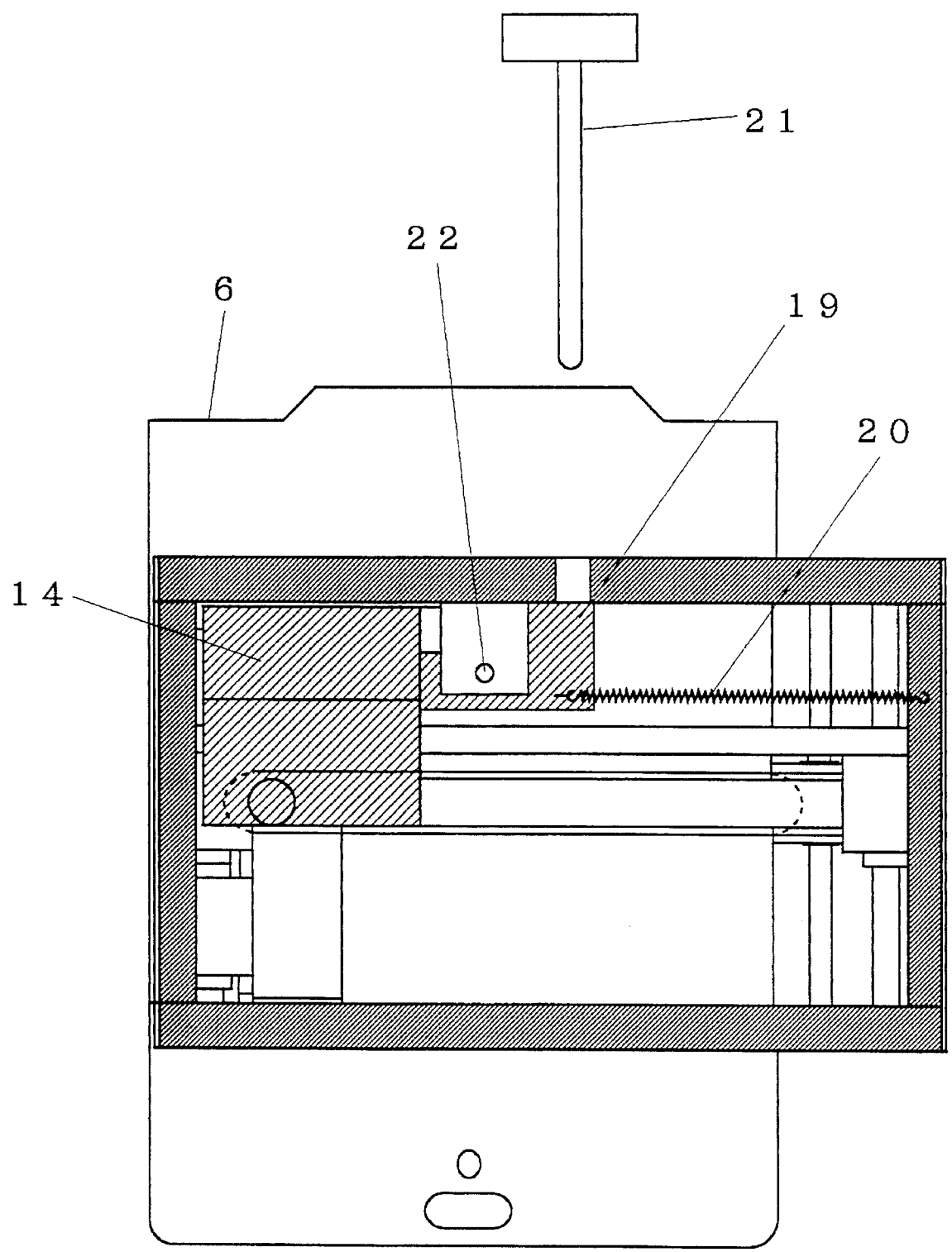
FIG. 6 depicts the state in which the control strip holder according to an embodiment of the present invention is installed in an automated print and development apparatus.
Figure 7:
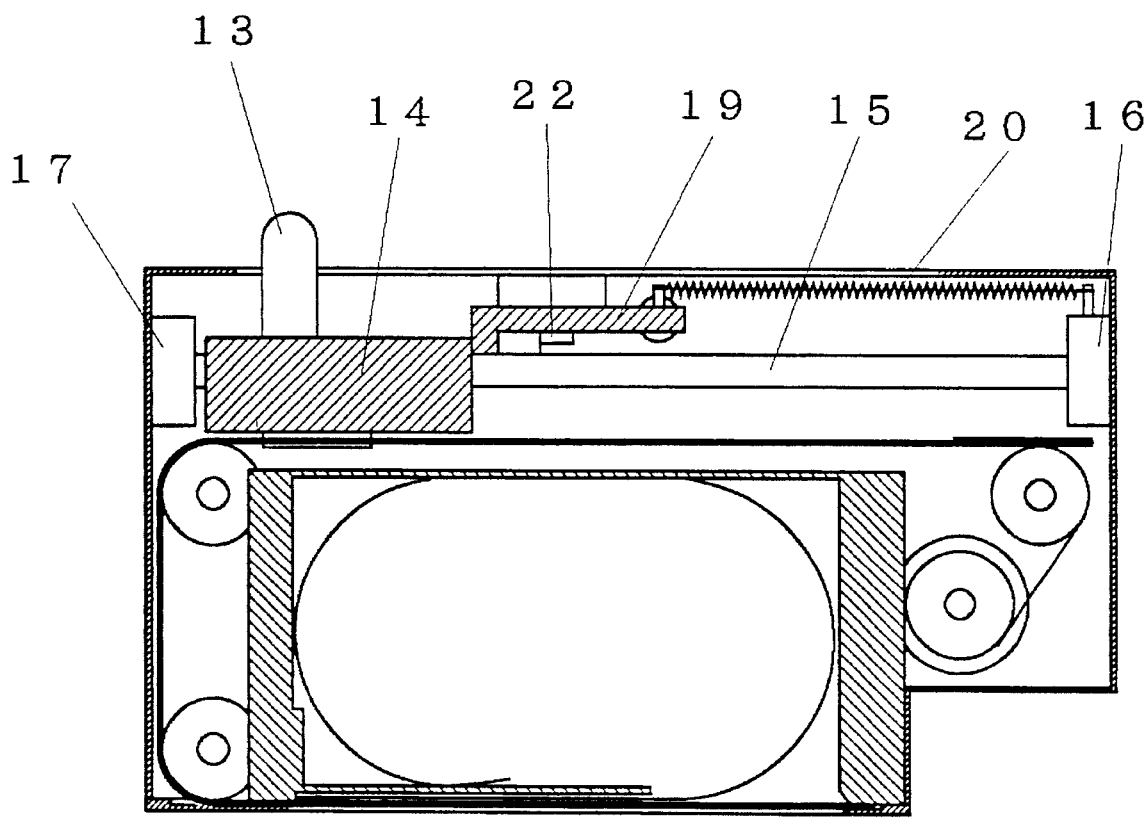
FIG. 7 illustrates the state in which the control strip holder according to an embodiment of the present invention is fitted in the automated print and development apparatus.

FIG. 6 shows a diagram that depicts the state in which the control strip holder according to the embodiment of the present invention is installed in an automated print and development apparatus. The control strip holder 6 loaded with a control strip is secured on the exposure station after opening the shielding door of the automated print and development apparatus, and the said shielding door being closed after establishment of the control strip. In the state of FIG. 6, the shielding door on the control strip holder is closed and the pin 21 that attaches to the frame of the automated print and development apparatus is not inserted. FIG. 7 illustrates the state in which the control strip holder is fitted in the automated print and development apparatus and is the side view of what is shown in FIG. 6.

Figure 8:
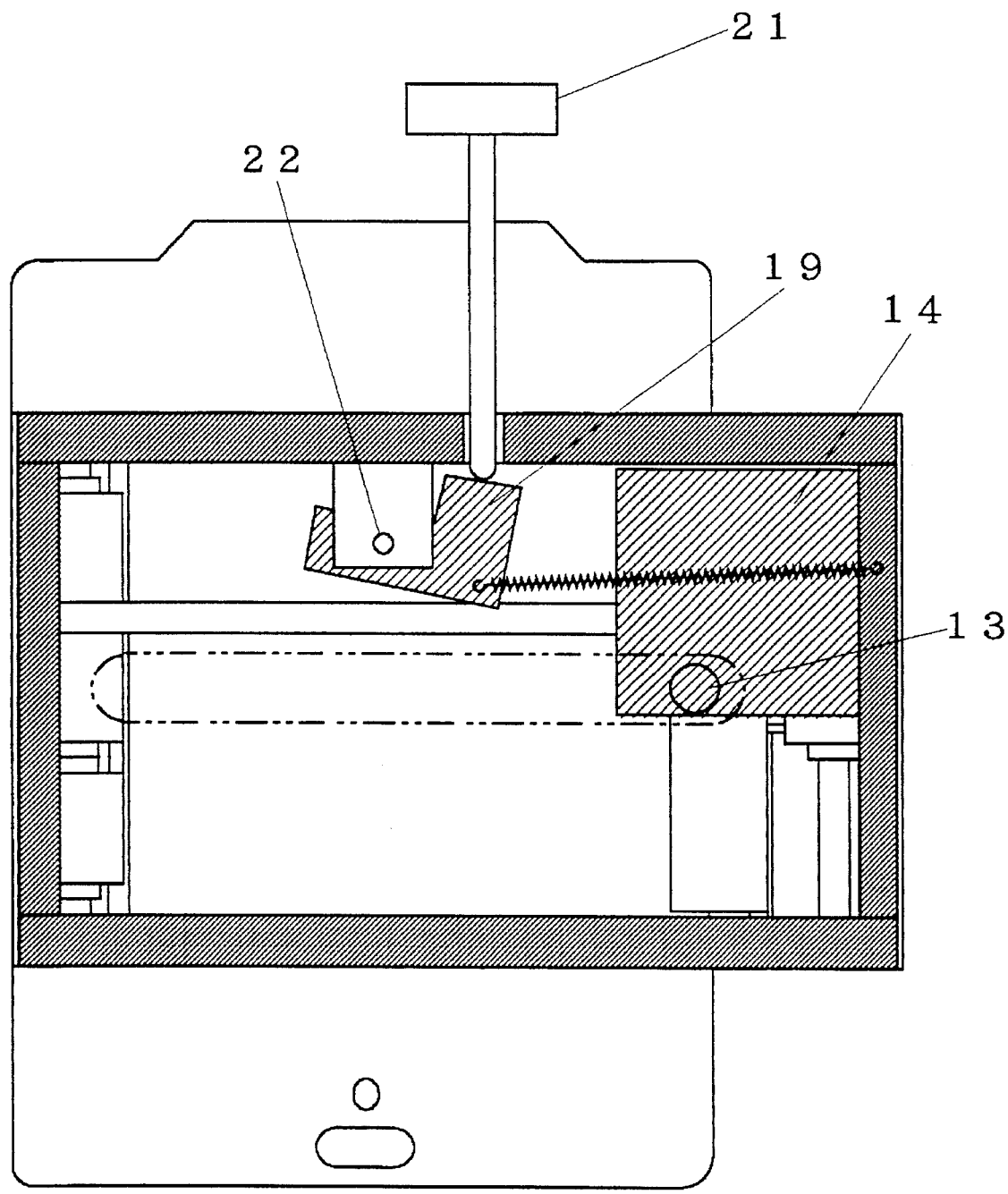
FIG. 8 illustrates the opened state of the shielding door of the control strip holder according to an embodiment of the present invention.
Figure 9:
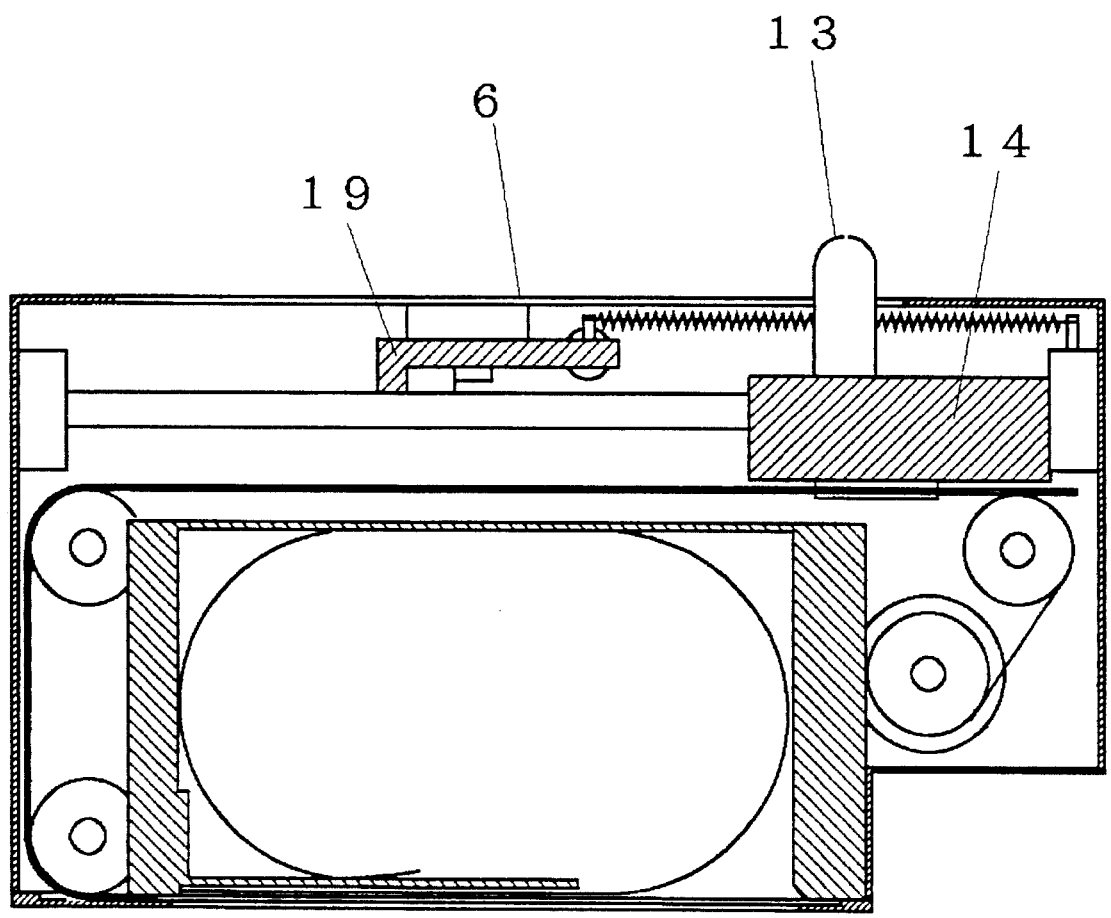
FIG. 9 illustrates the opened state of the shielding door of the control strip holder according to an embodiment of the present invention.

FIG. 8 illustrates the opened state of the shielding door of the control strip holder according to one embodiment of the present invention, and in this state the pin 21 that attaches to the frame is inserted in place after the said control strip holder is fitted, as shown in FIG. 7, to the automated print and development apparatus, whereby moving the locking block 14 and the shutter curtain in turn to open the shielding door. FIG. 9 illustrates the opened state of the shielding door of the control strip holder according to an embodiment of the present invention and is the side view of what is shown in FIG. 8.

The control strip holder 6 moves together with the exposure station and pushes the pin 21 fixed in the frame releasing the lock on the shutter curtain by pivoting the shutter locking arm 19 on the pivot 22 to move the shutter curtain 7 for opening the shielding door.

In this state, the position of the locking arm 19 is maintained by the pull of a coil spring 20. As a result of the movement of the control strip holder 6 together with exposure station, the pin 21 fitted to the frame releases the shutter locking arm 19 working against the pull of the coil spring 20. In addition, pulled by the spring 11 of uniform output the locking block moves, and hence the shutter curtain 7 of the control strip holder moves and opens the shielding door.

Next, the fan of the exposure station used for adhering photographic papers onto the said exposure station is activated, and the control strip gets adhered to the exposure station. The control strip returns to the original position (on the photographic paper conveyance path) together with the control strip holder of the exposure station. The photographic paper conveyor belt of the exposure station is then activated and conveys the control strip via the exit section to development processing section.

Figure 10:
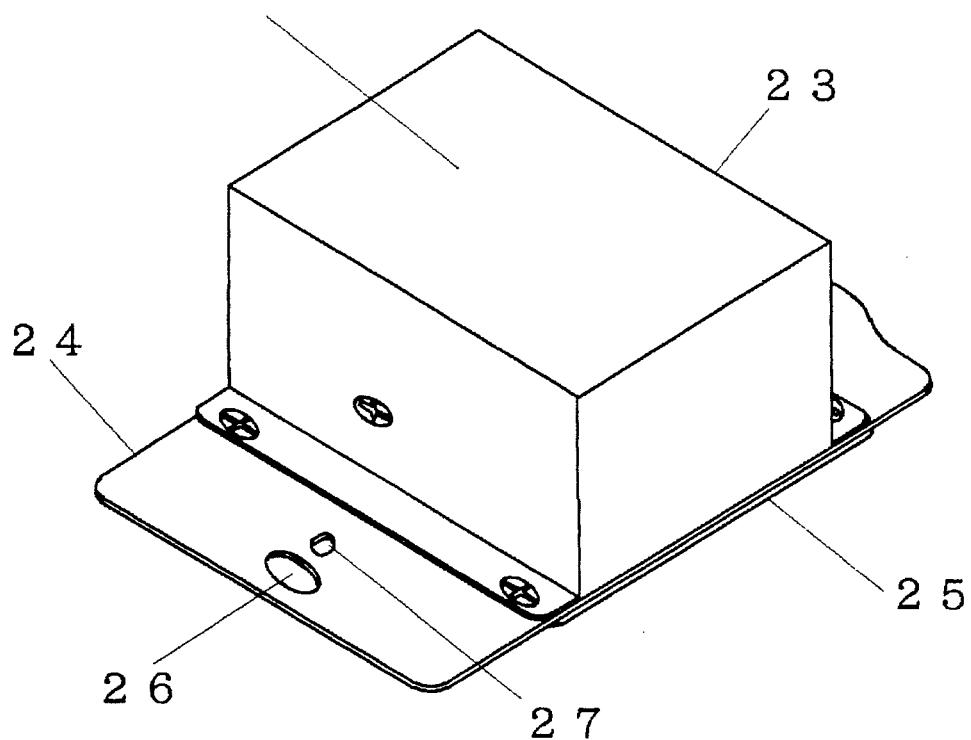
FIG. 10 shows in perspective view the appearance of the control strip holder according to an embodiment of the present invention.

FIG. 10 shows in perspective view the appearance of the control strip holder according to the embodiment of the present invention. Outwardly, the control strip holder consists of the control strip holder cover 23, control strip holder plate 24 and the mask plate 25, and in the control strip holder plate 24 locking-holes 26 and 27 are drilled. The control strip holder is then placed in a lightproof chamber or a darkroom) together with the control strip that is contained in a dark case. The control strip holder is kept so that the surface A faces downward.

Figure 11:
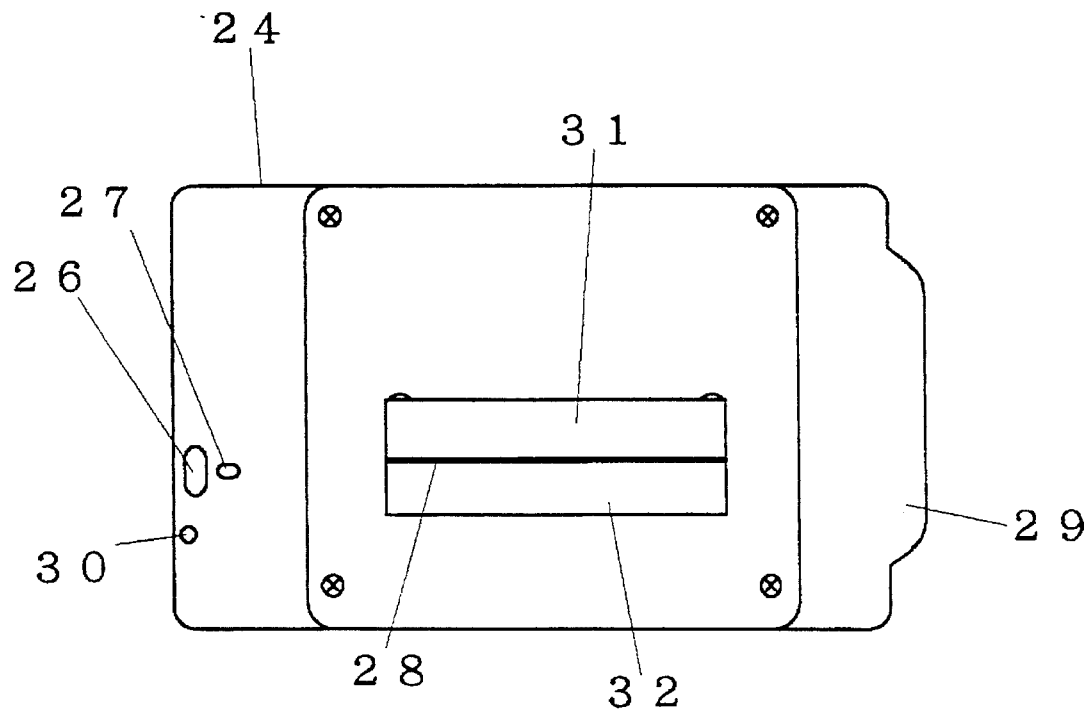
FIG. 11 shows the appearance of the rear side of the control strip holder according to an embodiment of the present invention.

FIG. 11 shows the appearance of the rear side of the control strip holder according to the embodiment of the present invention. The insertion port of control strip 28 is shut off from light by the shielding members 31 and 32 made of velvet. The control strip holder plate 24 is provided with a petal 29 for locking, a pin 30 and locking holes 26 and 27.

Figure 12:
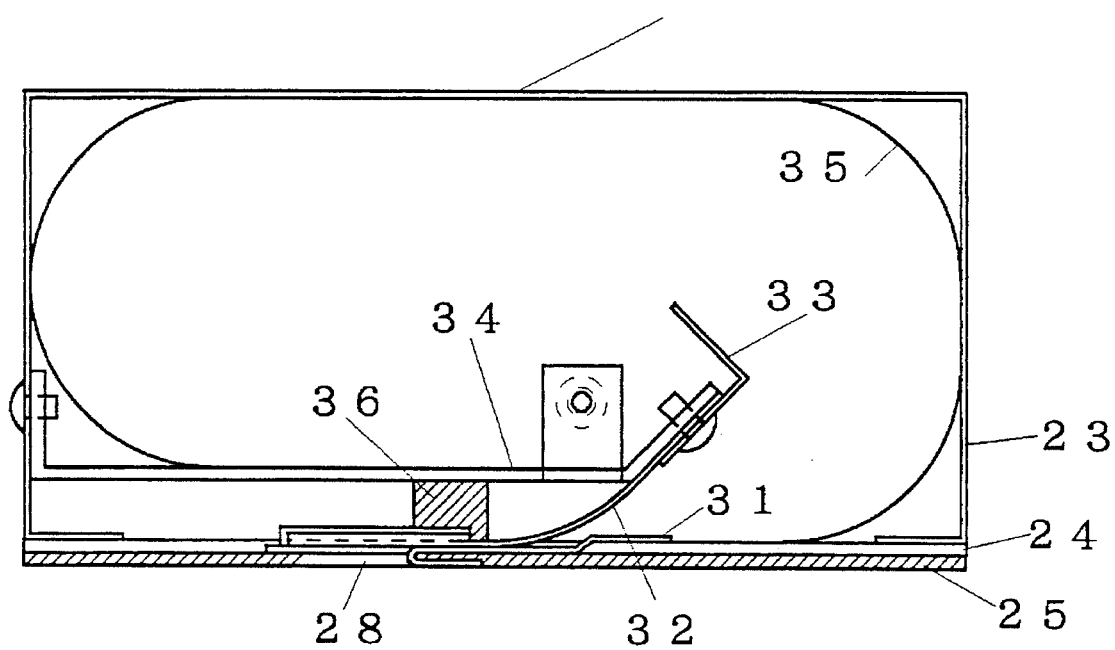
FIG. 12 illustrates in sectional side view the embodiment of the control strip holder of the present invention.
Figure 13:
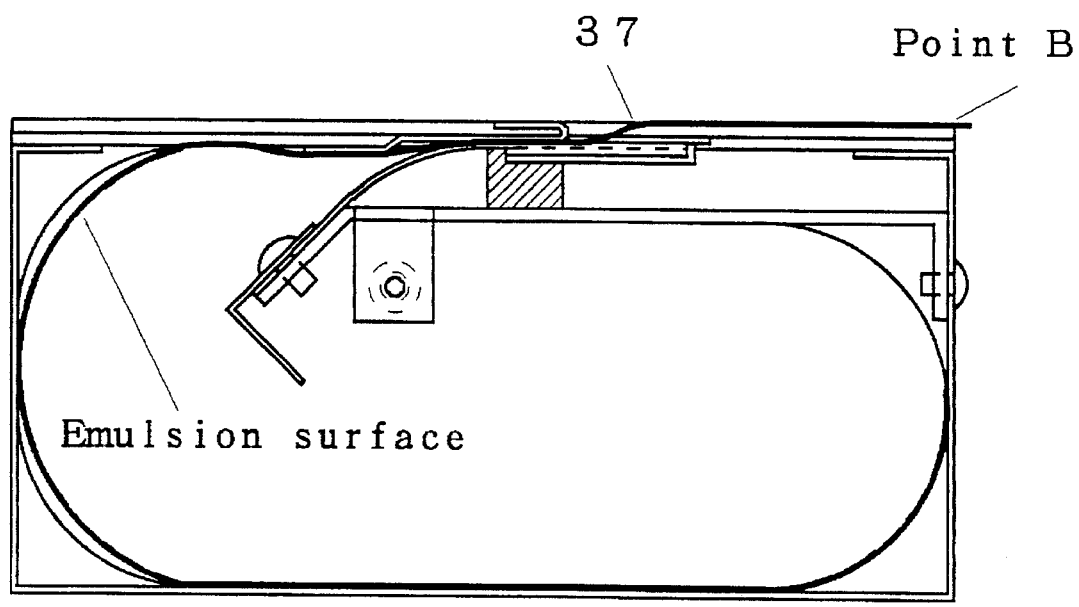
FIG. 13 illustrates in sectional side view the embodiment of the control strip holder of the present invention.

FIGS. 12 and 13 illustrate in sectional side views the embodiment of the control strip holder of the present invention. Taken out of its dark case, one sheet of control strip is inserted through the control strip insertion port 28 from the rear end of the control strip with the emulsion side turned toward the side of the control strip holder until the leading end becomes flush with the point B of FIG. 13.

The control strip insertion port 28 is shielded from light by the shielding members 31 and 32 and a spongy shielding member 36. The shielding member 31 is supported by the plate 33 that is secured on the shield holder plate 3&. Control strip guide 35, which is a thin sheet, guides the control strip.

Figure 14:
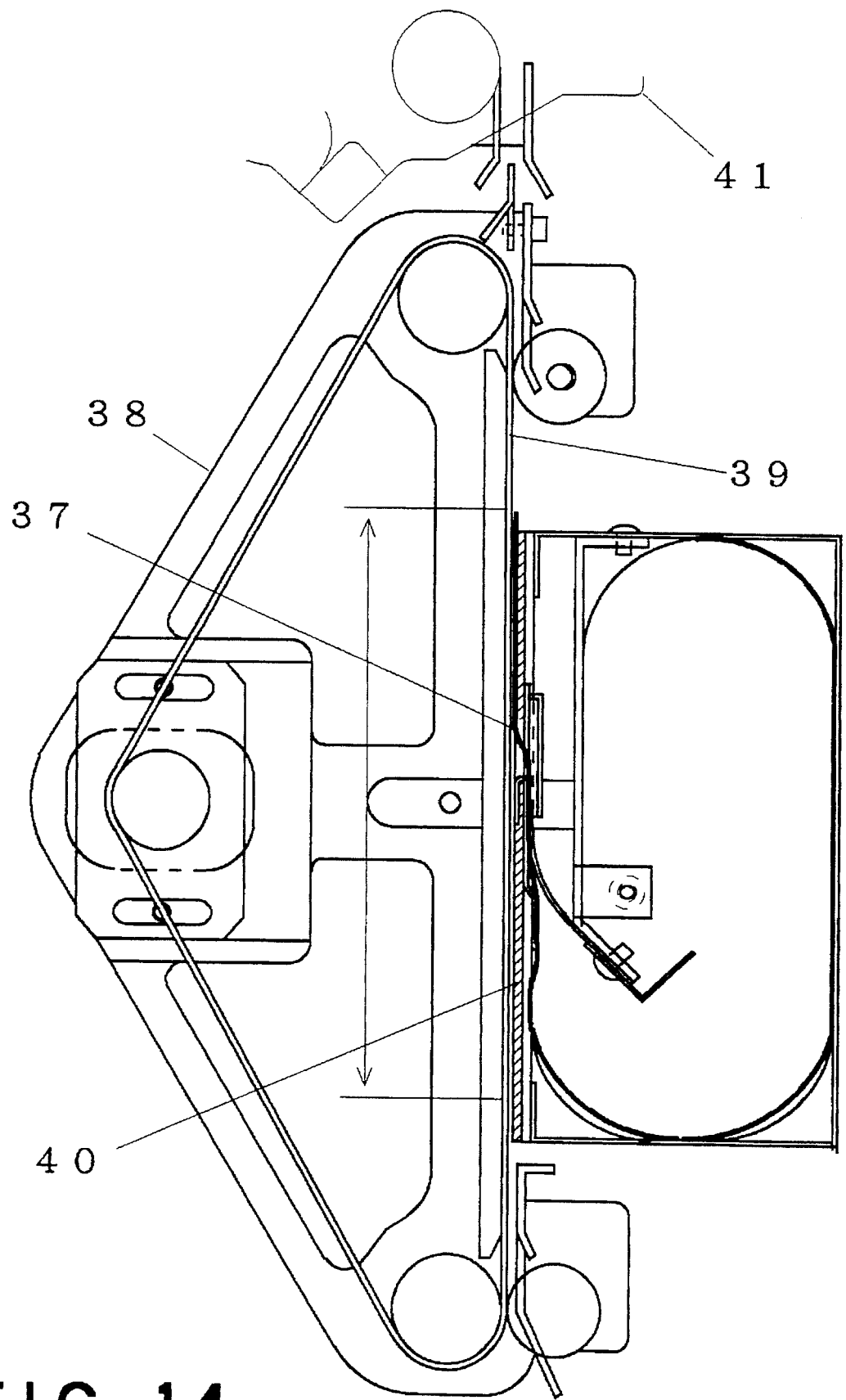
FIG. 14 illustrates in sectional view the embodiment of the control strip holder and exposure station with regard to the present invention.

FIG. 14 illustrates the sectional view of the control strip holder and exposure station according to the embodiment of the present invention. The shielding door of the automated print and development apparatus is opened, and after establishing the control strip holder taken out of the lightproof chamber (or darkroom) on the exposure station as shown in the figure, said shielding door is closed. Suction fan of the exposure station is then started which adheres the control strip 37 on the conveyor belt 39 of the exposure station 38. The arrows demarcates the suction region of the exposure station.

The mask plate 40 of the control strip holder is constructed in such a way that said mask plate covers, within the suction region of the exposure station, the regions except those in which the control strip protrudes from the control strip holder. Consequently, the force of adherence of the control strip is stronger than in the case of conventional photographic papers.

In that manner, a conveyance force that overcomes the resistance at the control-strip insertion port of the control strip holder can be obtained. The conveyor belt 39 of the exposure station is activated, and the control strip is conveyed through the exit section 41 into the development process section.

We claim:

1. A control strip holder which is placed in an automated printing and developing apparatus equipped with an exposure station having a suction mechanism, the control strip holder comprising a masking plate which covers the suction region of the exposure station except for the area in which a leading edge of the control strip contacts the exposure station, said masking plate being provided on the side of the control strip holder which contacts the exposure station.

2. A control strip holder which is placed in an automated printing and developing apparatus equipped with an exposure station having a suction mechanism, the control strip holder comprising:

a masking plate which covers the suction region of the exposure station except for the area in which a leading edge of the control strip contacts the exposure station, said masking plate being provided on the side of the control strip holder which contacts the exposure station, and a shielding door which is opened or closed in response to an external command and exposes a part of the control strip when the command is for open.

* * * * *

UNITED STATES PATENT AND TRADEMARK OFFICE
CERTIFICATE OF CORRECTION

PATENT NO. : 5,530,519
DATED : June 25, 1996
INVENTOR(S) : Hiroshi MIYAWAKI et al.

It is certified that error appears in the above-indentified patent and that said Letters Patent is hereby corrected as shown below:

On the title page, item [22] should read as follows:

--[22] PCT Filed: May 12, 1993--

Signed and Sealed this

Twenty-ninth Day of October 1996

Attest:

BRUCE LEHMAN

*Attesting Officer*  *Commissioner of Patents and Trademarks*